(12) United States Patent
Yamazaki

(10) Patent No.: US 7,806,435 B2
(45) Date of Patent: Oct. 5, 2010

(54) GAS GENERATOR

(75) Inventor: Masayuki Yamazaki, Tatsuno (JP)

(73) Assignee: Daicel Chemical Industries, Ltd., Osaka (JP)

(*) Notice: Subject to any disclaimer, the term of this patent is extended or adjusted under 35 U.S.C. 154(b) by 443 days.

(21) Appl. No.: 11/011,032

(22) Filed: Dec. 15, 2004

(65) Prior Publication Data

US 2005/0151357 A1 Jul. 14, 2005

Related U.S. Application Data

(60) Provisional application No. 60/532,883, filed on Dec. 29, 2003.

(30) Foreign Application Priority Data

Dec. 19, 2003 (JP) ............................. 2003-422923

(51) Int. Cl.
*B60R 21/26* (2006.01)
(52) U.S. Cl. ..................................... 280/741
(58) Field of Classification Search ................... 280/741
See application file for complete search history.

(56) References Cited

U.S. PATENT DOCUMENTS

| 5,482,316 | A | * | 1/1996 | Lang et al. .................. 280/741 |
| 5,951,040 | A | | 9/1999 | McFarland et al. |
| 6,068,294 | A | * | 5/2000 | Jordan ......................... 280/741 |
| 6,234,521 | B1 | * | 5/2001 | Katsuda et al. ............. 280/736 |
| 6,491,321 | B1 | * | 12/2002 | Nakashima et al. ......... 280/736 |
| 6,527,297 | B1 | | 3/2003 | Parkinson et al. |
| 6,540,256 | B2 | | 4/2003 | Iwai et al. |
| 6,695,345 | B2 | * | 2/2004 | Katsuda et al. ............. 280/736 |
| 6,832,777 | B2 | | 12/2004 | Tanaka |
| 7,059,635 | B2 | * | 6/2006 | Ryobo et al. ................ 280/741 |
| 7,520,530 | B2 | * | 4/2009 | Yamazaki .................... 280/736 |
| 2003/0042718 | A1 | | 3/2003 | Katsuda et al. |
| 2003/0047925 | A1 | | 3/2003 | Edwards, II et al. |
| 2008/0118408 | A1 | * | 5/2008 | Numoto et al. ............. 422/167 |

FOREIGN PATENT DOCUMENTS

| EP | 1053916 A1 | 11/2000 |
| EP | 1479573 A2 | 11/2004 |
| JP | 9-226509 A | 9/1997 |
| JP | 11-5508 A | 1/1999 |
| JP | 11-348711 | 12/1999 |
| JP | 2001-097177 | 4/2001 |
| JP | 2002-283947 | 10/2002 |
| JP | 2002-370607 A | 12/2002 |

* cited by examiner

*Primary Examiner*—Paul N. Dickson
*Assistant Examiner*—Joselynn Y. Sliteris
(74) *Attorney, Agent, or Firm*—Birch, Stewart, Kolasch & Birch, LLP

(57) ABSTRACT

A housing 11 has an upper annular inclined surface 14 and a lower annular inclined surface 15. An annular filter 20 accommodated inside the housing has the end surface shape matching that of the inclined surfaces 14, 15. When the housing expands and deforms in the axial direction by the pressure during actuation, the inclined surfaces 14, 15 cannot be easily deformed. Therefore, the gas is prevented from leaking from the abutment portion of the inclined surfaces 14, 15 and annular filter 20. As a result, the entire gas is discharged via the annular filter 20.

11 Claims, 4 Drawing Sheets

GAS GENERATOR

This Nonprovisional application claims priority under 35 U.S.C. § 119(e) on U.S. Provisional Application No. 60/532,883 filed on Dec. 29, 2003 and under 35 U.S.C. § 119(a) on Patent Application No. 2003-422923 filed in Japan on Dec. 19, 2003, the entire contents of which are hereby incorporated by reference.

BACKGROUND OF THE INVENTION

1. Field of the Invention

The present invention relates to a gas generator suitable for an air bag system carried on a vehicle and to an air bag apparatus.

2. Description of the Related Art

A gas generator for an air bag serves to supply into the air bag an inflation gas for protecting an occupant. A recent trend to cost down led to the simplification of the bag itself and the use of thin cloths. Therefore, if impurities are present in the generated gas, the bag cloth can be ruptured by the ejection of the gas from the gas generator. Therefore, the generated gas from the gas generator has to be clean.

In particular, when the gas generator is a pyrotechnic type gas generator in which the combustion gas is generated by burning a solid gas generating agent, combustion residues are generated. For this reason, a filter for filtering and cooling the combustion residues has been conventionally used in the pyrotechnic type gas generators.

In the pyrotechnic type gas generators, the housing is most often made from aluminum or the internal structure is simplified to reduce weight. For this reason, the pressure inside the housing sometimes rises at the same time as the gas generating agent starts to burn, and the housing is deformed by this pressure. As long as the housing strength is maintained, the deformation itself causes no problem. However, the deformation creates a gap between the filter and the housing wall surface that is in contact with the filter, and there is a risk that a short path phenomenon will occur in which a combustion gas that has not yet been sufficiently cooled and purified is discharged into the air bag.

US-A No. 2003/0047925 is a prior art relating to the present invention. In this gas generator, a single space is formed inside the gas generator by a combination of a base 16 and a cap 14, and a gas generating agent 23, a filter, 28, and an igniter 18 are disposed therein.

However, in the above-described conventional gas generator, the respective parts of the outer peripheral surface on the upper and lower end sides of the filter 28 abut against the inner peripheral surface of the housing, making it difficult for the gas to pass in those portions and decreasing the efficiency of cooling and purification. As a result, an adverse effect is produced on the bag cloth.

Other prior arts are JP-A No. 9-226509, JP-A No. 11-5508 (corresponding to U.S. Pat. No. 5,951,040), JP-A No. 2002-370607 and U.S. Pat. No. 6,527,297.

JP-A No. 9-226509 discloses a gas generator for an air bag having a central ignition chamber in which ignition devices are arranged and a combustion chamber in which a gas generating agent and filter member are arranged.

JP-A No. 11-5508 discloses an air bag inflator including a housing and an inflation fluid source in the housing actuatable to provide a pressurized inflation fluid.

JP-A No. 2002-370607 discloses a single cylinder type gas generator including, in a housing, a filter material, a gas generating agent in a combustion chamber defined in the filter material, and a charge cylinder unit provided with a flame jet nozzle and including ignition means.

U.S. Pat. No. 6,527,297 discloses inflator device assemblies in which an igniter composition to ignite a gas generant material is provided on a selected surface, such as on a damper pad, within the inflator device.

SUMMARY OF THE INVENTION

It is a purpose of the present invention to provide a gas generator which, when applied as a gas generator for an air bag, does not degrade the air bag inflation performance even when the housing structure is simplified or the material thereof is so selected as to reduce weight.

In order to attain this object, the present invention provides a gas generator comprising: a housing composed of a peripheral wall portion having a gas discharge port, a top plate; and a bottom plate, ignition means accommodated inside the housing; a gas generating agent which is ignited and burned with the ignition means; and an annular filter disposed so as to surround the ignition means and gas generating agent, wherein a surface including the annular contact portion of the peripheral wall portion and the top plate is formed as an upper annular inclined surface, and a surface including the annular contact portion of the peripheral wall portion and the bottom plate is formed as a lower annular inclined surface, and the annular filter is so disposed that both end surfaces thereof abut against the upper annular inclined surface and lower annular inclined surface and a gap is provided between the annular filter and the peripheral wall portion.

The operation effect of the present invention (effect preventing the short path phenomenon) will be explained with reference to FIG. 6. FIG. 6 illustrates the operation effect of the present invention and shows, with a certain exaggeration, the deformation state of the housing.

As shown in FIG. 6(*a*), the housing of the conventional technology has been formed from a peripheral wall portion 1, a top plate 2, and a bottom plate 3, and an annular filter 5 was disposed inside thereof.

When the gas generator is actuated, the top plate 2 and bottom plate 3 expand in the axial direction and assume the state of the top plate 2' and bottom plate 3' shown by a chain double-dashed line. In this state, gaps appear between one end surface 6 of the annular filter 5 and the top plate 2', and between the other end surface 7 and the bottom plate 3'. As a result, the combustion gas that did not pass through the annular filter 5 (short path of the combustion gas) is discharged into the air bag.

On the other hand, in the housing in accordance with the present invention, as shown in FIG. 6(*b*), the surface comprising the annular contact portion (1*a* in FIG. 6(*a*)) of the peripheral wall portion 1 and top plate 2 forms an upper annular inclined surface 2*a*, and the surface comprising the annular contact portion (1*b* in FIG. 6(*a*)) of the peripheral wall portion 1 and bottom plate 3 forms a lower annular inclined surface 3*a*.

Further, one end surface 6 of the annular filter 5 abuts against the upper annular inclined surface 2*a*, the other end surface 7 abuts against the lower annular inclined surface 3*a*, and the disposition is such that a gap is formed between the annular filter and the peripheral wall portion 1. The upper annular inclined surface 2*a* and lower annular inclined surface 3*a* may be plane or curved.

The one end surface 6 and other end surface 7 of the annular filter 5 are preferably in contact only with the upper annular inclined surface 2*a* and lower annular inclined surface 3*a*, but part thereof may be in contact with the top plate 2 and bottom plate 3. When part of the one end surface 6 and other end surface 7 is in contact with the top plate 2 and bottom plate 3 respectively, 50% or more, preferably 65%, even more preferably 80% or more of the total surface area of the one end surface 6 and other end surface 7 is in contact with the upper annular inclined surface 2a and lower annular inclined surface 3a.

When the gas generator is actuated, the top plate 2 and bottom plate 3 expand in the axial direction by pressure and assume the state of the top plate 2' and bottom plate 3' shown by a chain double-dashed line. At this time, the top plate 2' and bottom plate 3' are expanded and deformed so that an angle α1 is formed between the extension line of the top plate 2 and a tangential line of the top plate 2', and an angle β1 is formed between the extension line of the bottom plate 3 and a tangential line of the bottom plate 3'.

On the other hand, in the upper annular inclined surface 2a and lower annular inclined surface 3a, the angle α2 formed by the top plate 2 and upper annular inclined surface 2a is set to be equal or close to the aforementioned angle α1, and the angle β2 formed by the bottom plate 3 and lower annular inclined surface 3a is set to be equal or close to the aforementioned angle β1.

Thus, the upper annular inclined surface 2a and lower annular inclined surface 3a in FIG. 6(b) are set to the shape (that is, most preferably, α1=α2 and β1=β2) identical to that during the expansion and deformation shown in FIG. 6(a) (in other words, they are set to the shape which is difficult to deform) and are practically not expanded.

For this reason, even when the gas generator is actuated, hardly any gap is formed between the two end surfaces 6, 7 of the annular filter 5 and the upper and lower annular inclined surfaces 2a, 3a, and the occurrence of the short path phenomenon inherent to the conventional technology is prevented.

Furthermore, expansion of the annular filter 5 outwardly in the radial direction under the effect of pressure acting during the combustion of the gas generating agent can be also considered. However, when the annular filter 5 expands outwardly in the radial direction, as shown in FIG. 6(b), the two end surfaces 6, 7 and the upper and lower annular inclined surfaces 2a, 3a are brought into contact in a state in which they are more strongly pressed against each other. Therefore, the effect of preventing the short path is practically not influenced.

Further, because the annular filter is so set that a gap is provided with the peripheral wall portion of the housing, the generated gas passes through the entire region of the filter. Therefore, the gas cooling and purification efficiency is increased.

In the gas generator in accordance with the present invention, the two end surfaces of the annular filter and the upper and lower annular inclined surfaces are preferably pressed against each other in the axial direction of the housing.

Pressing the two end surfaces of the annular filter and the upper and lower annular inclined surfaces against each other is preferable because it increases the degree of air tightness in the contact surface and improves the short path prevention effect.

The annular filter preferably has a structure with elasticity in at least the axial direction, and is prepared, for example, by multilayer braiding a plain-woven wire mesh and compressing in a mold or is substantially composed of a structure obtained by continuously winding a single wire in any number of layers.

It is preferable that in the gas generator in accordance with the present invention, a tubular member with the inner space thereof serving as a first combustion chamber is disposed inside the housing, this tubular member having a tubular main portion and an annular plane extending in the radial direction of the housing from the edge of the open portion at one end of the main portion, the tubular member is disposed concentrically with the housing, the annular plane abuts against the top plate, and ignition means is accommodated and fixed in the open portion at the other end, and the outer peripheral edge of the annular plane abuts against the inner peripheral surface of the annular filter and covers from the inside the contact portion of the top plate and both end surfaces of the annular filter.

The thickness of the annular plane is sufficiently increased or the outer peripheral edge of the annular plane is bent in the direction of the bottom plate to abut against the inner peripheral surface of the annular filter and to cover the contact portion of the top plate and both end surfaces of the annular filter from the inside. However, the length of the bent portion of the annular plate is such that the combustion gas is not prevented from passing through the entire area of the filter.

Disposing such a tubular member and covering the contact portion of the top plate and both end surfaces of the annular filter from the inside with the outer peripheral edge of the annular plane of the tubular member is preferable from the standpoint of further increasing the short path prevention effect.

Further, abutting against the inner peripheral surface of the filter facilitates positioning of the filter during assembly operation.

Furthermore, the main portion and annular plate may be integrated or they may be separate members, it is preferable that they be separate members because the number of process steps is small. When they are separate members, the end portion of the main portion on the side of the top plate may be closed.

It is preferable that in the gas generator in accordance with the present invention, the top plate have a recessed portion in the central part (protrusion toward the inside of the housing) and that the recessed portion be located inside the open portion at one end side of the tubular member.

Thus locating the recessed portion inside the open portion at one end side of the tubular member or inside the central hole of the annular plate, preferably, fitting the recessed portion in the open portion at one end side of the tubular member or in the central hole of the annular plate, fixes the tubular member, thereby preventing the displacement of the outer peripheral edge of the annular plane. Therefore, the short path prevention effect is further enhanced.

Further, because positioning of the tubular member is facilitated, positioning of the annular filter is also facilitated.

In order to obtain such operation effects, it is desirable that the shape of the recessed portion match the shape of the open portion at one end side of the tubular member or the shape of the central hole of the annular plate and that the size thereof be adjusted so as to avoid the displacement or play when they are mated.

It is preferable that in the gas generator in accordance with the present invention, the ignition means have a gas generating agent (gas generating agent for flame propagation) and an igniter, and the combustion temperature of the gas generating agent (gas generating agent for flame propagation) used as one ignition means be higher than the combustion temperature of a gas generating agent (gas generating agent for air bag inflation), which is ignited and burned by the ignition means. Boron potassium nitrate, which is a well-known flame propagation agent, can be used instead of part or entire gas generating agent for flame propagation.

Using a gas generating agent having a low combustion temperature makes it possible to reduce the weight of the filter. Therefore, the weight and size of the gas generator can be decreased. However, gas generating agents having a low combustion temperature generally demonstrate poor ignition performance and are especially disadvantageous when the gas generating agent is directly ignited with an igniter with the object of simplifying the structure.

Accordingly, introducing a gas generating agent with a higher combustion temperature between the gas generating agent with a lower combustion temperature and the igniter, first, igniting this gas generating agent with a high combustion temperature, and then igniting the gas generating agent with a low combustion temperature by the energy thereof, makes it possible to increase the ignition capability of the gas generating agent with a low combustion temperature.

A gas generating agent with a combustion temperature of 1700 to 3000° C. can be used as the gas generating agent with a high combustion temperature. For example, it is possible to use nitroguanidine as a fuel and strontium nitrate as an oxidizing agent and to add, if necessary, sodium salt of carboxymethyl cellulose as a binder and Japanese acid clay as a residue trapping agent.

A gas generating agent with a combustion temperature of 1000 to 1700° C. can be used as a gas generating agent with a low combustion temperature. For example, it is possible to use guanidine nitrate or melanin as a fuel and basic copper oxide as an oxidizing agent and to add, if necessary, sodium salt of carboxymethyl cellulose as a binder and other additives (cooling agent such as aluminum hydroxide).

Gases generated by combustion of both gas generating agents contribute to the air bag inflation, but because the amount of the gas generating agent with a low combustion temperature is substantially greater, the temperature of the entire combustion gas decreases. Therefore, the amount of coolant (thickness or density) can be reduced.

Further, adjusting the amount of the gas generating agent with a high combustion temperature and the gas generating agent with a low combustion temperature also makes contribution to control of the gas generator output.

The air bag apparatus in accordance with the present invention comprises the gas generator for an air bag in accordance with the present invention, an impact sensor for actuating the gas generator upon sensing an impact, an air bag to be inflated by receiving the gas generated by the gas generator, and a module case accommodating the air bag.

The aforementioned gas generator for an air bag is accommodated inside the module case together with the air bag, which is inflated by the gas generated by the gas generator, thereby forming the air bag apparatus. In this air bag apparatus, the gas generator is actuated following the detection of an impact with the impact sensor, and a combustion gas is discharged from the gas discharge port of the housing. The combustion gas flows into the air bag. As a result, the air bag is inflated, rupturing the module cover and forming a cushion absorbing the impact between an occupant and hard structural components located inside the vehicle.

With the gas generator in accordance with the present invention, the generated gas produced by combustion of gas generating agents is prevented from leaking out from the abutment zone of the filter and housing. Therefore, the inflation performance of the air bag is not degraded.

BRIEF DESCRIPTION OF THE DRAWINGS

FIG. 6(*b*) illustrates the operation effect of the gas generator in accordance with the present invention.

DETAILED DESCRIPTION OF THE INVENTION

Figure 1:
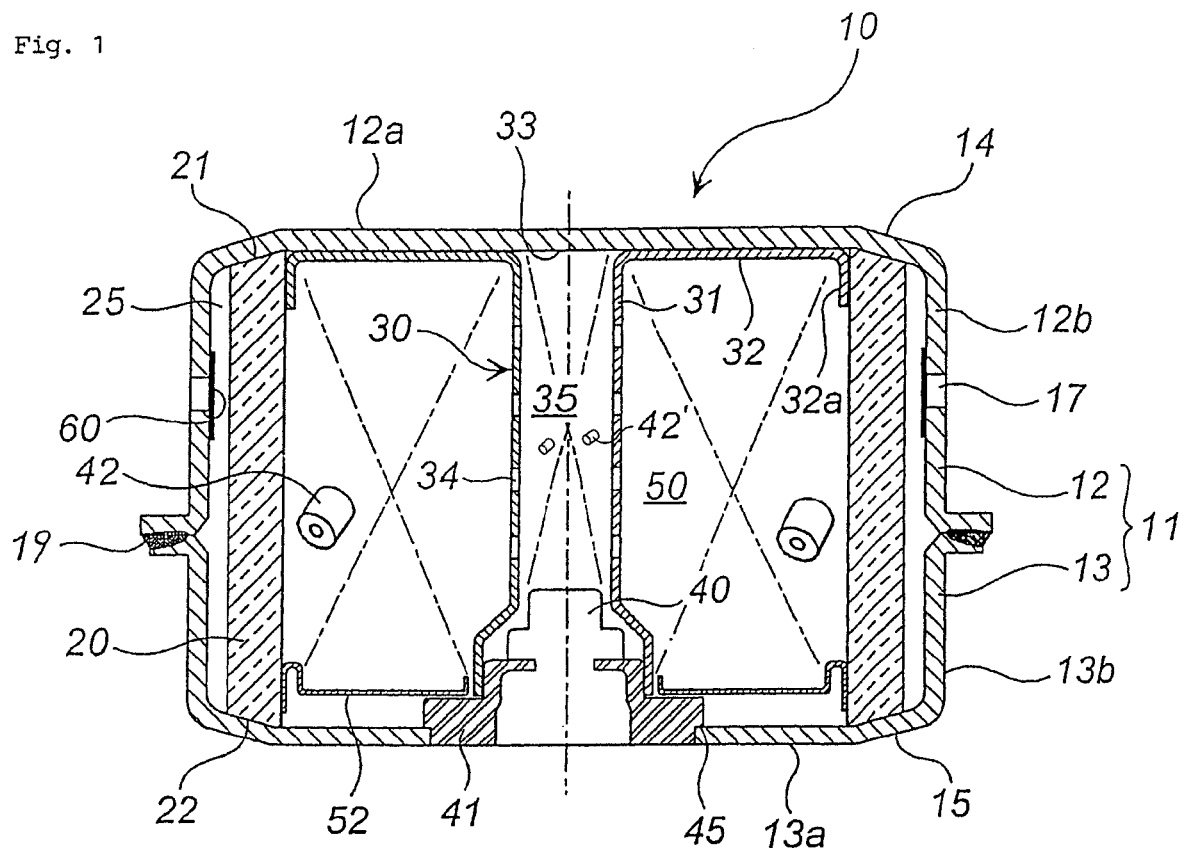
FIG. 1 is a cross-sectional view of the gas generator in accordance with the present invention in the axial direction.
Figure 2:
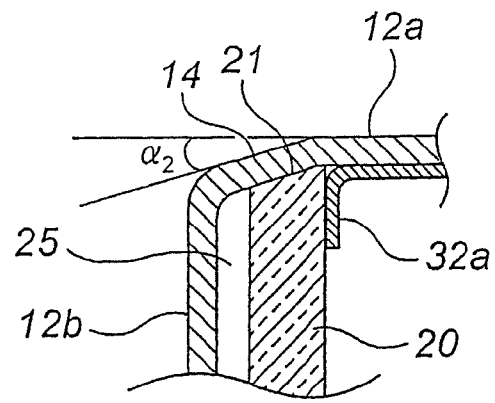
FIG. 2 is a partial enlarged view shown in FIG. 1.
Figure 3:
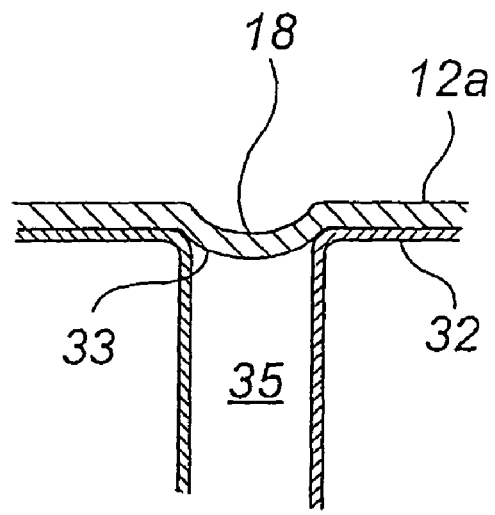
FIG. 3 is a partial enlarged view of the embodiment different from that shown in FIG. 1.
Figure 4:
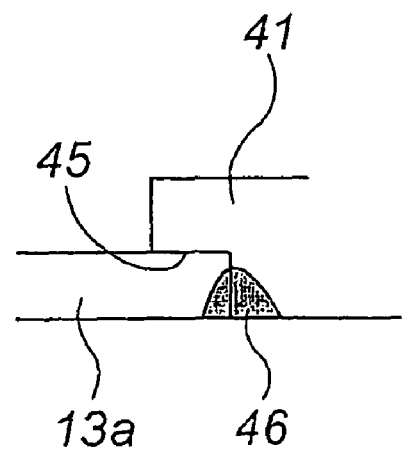
FIG. 4 is a partial enlarged view shown in FIG. 1.
Figure 5:
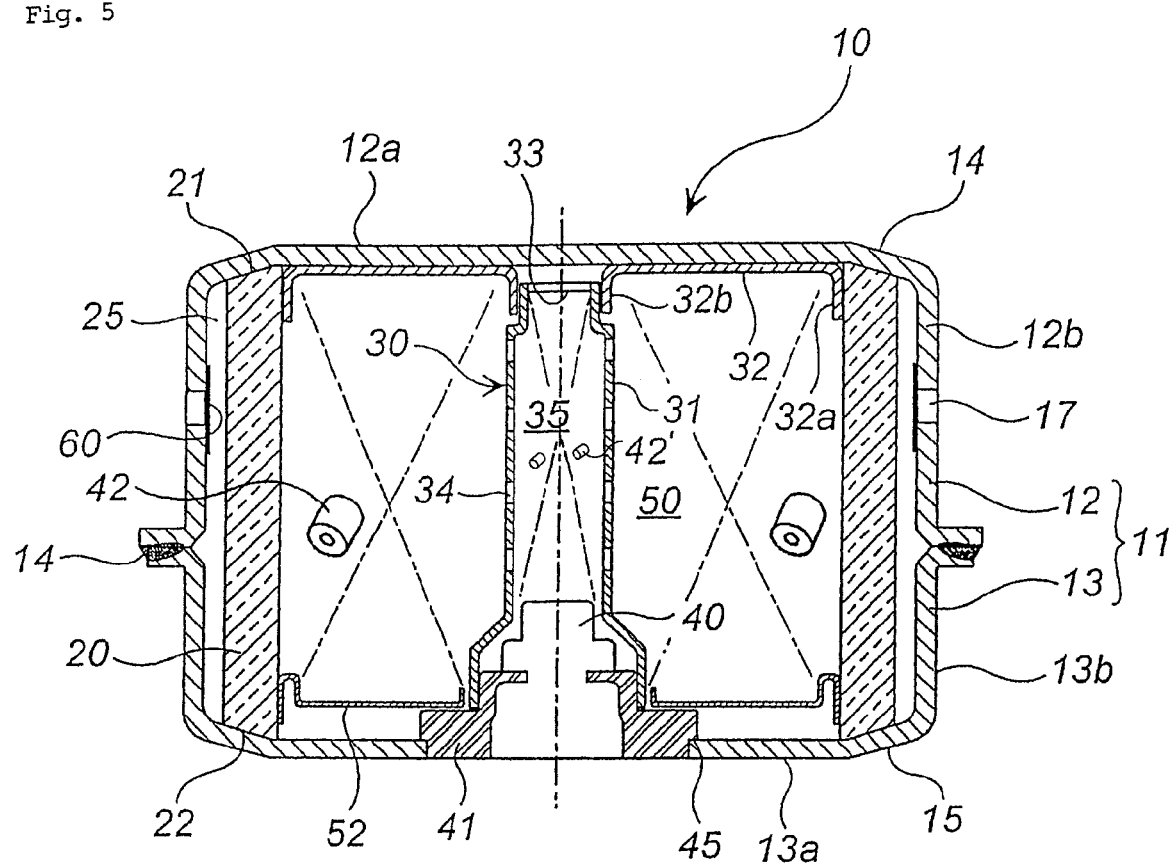
FIG. 5 is a cross-sectional view in the axial direction of a gas generator which is another embodiment of the present invention.

Embodiments of the present invention will be described below with reference to the appended drawings. FIG. 1 is a cross-sectional view in the axial direction of the gas generator in accordance with an embodiment of the present invention. FIG. 2 is a partially enlarged view of FIG. 1. FIG. 3 is a partially enlarged view of the embodiment different from that shown in FIG. 1. FIG. 4 is a partially enlarged view of FIG. 1. FIG. 5 is a cross-sectional view in the axial direction of the embodiment different from that shown in FIG. 1.

In a gas generator 10, the outer shell container is formed by a housing 11 in which a diffuser shell 12 forming a top plate 12*a* and about half of a peripheral wall 12*b* is joined to a closure shell 13 forming together with the diffuser shell 12 an inner accommodation space and also forming a bottom plate 13*a* and the remaining peripheral wall 13*b*.

The diffuser shell 12 and closure shell 13 are joined together, for example, by laser welding in a welded portion 19, this welding forming a single peripheral wall (combination of the peripheral walls 12*b* and 13*b*).

Figure 6:
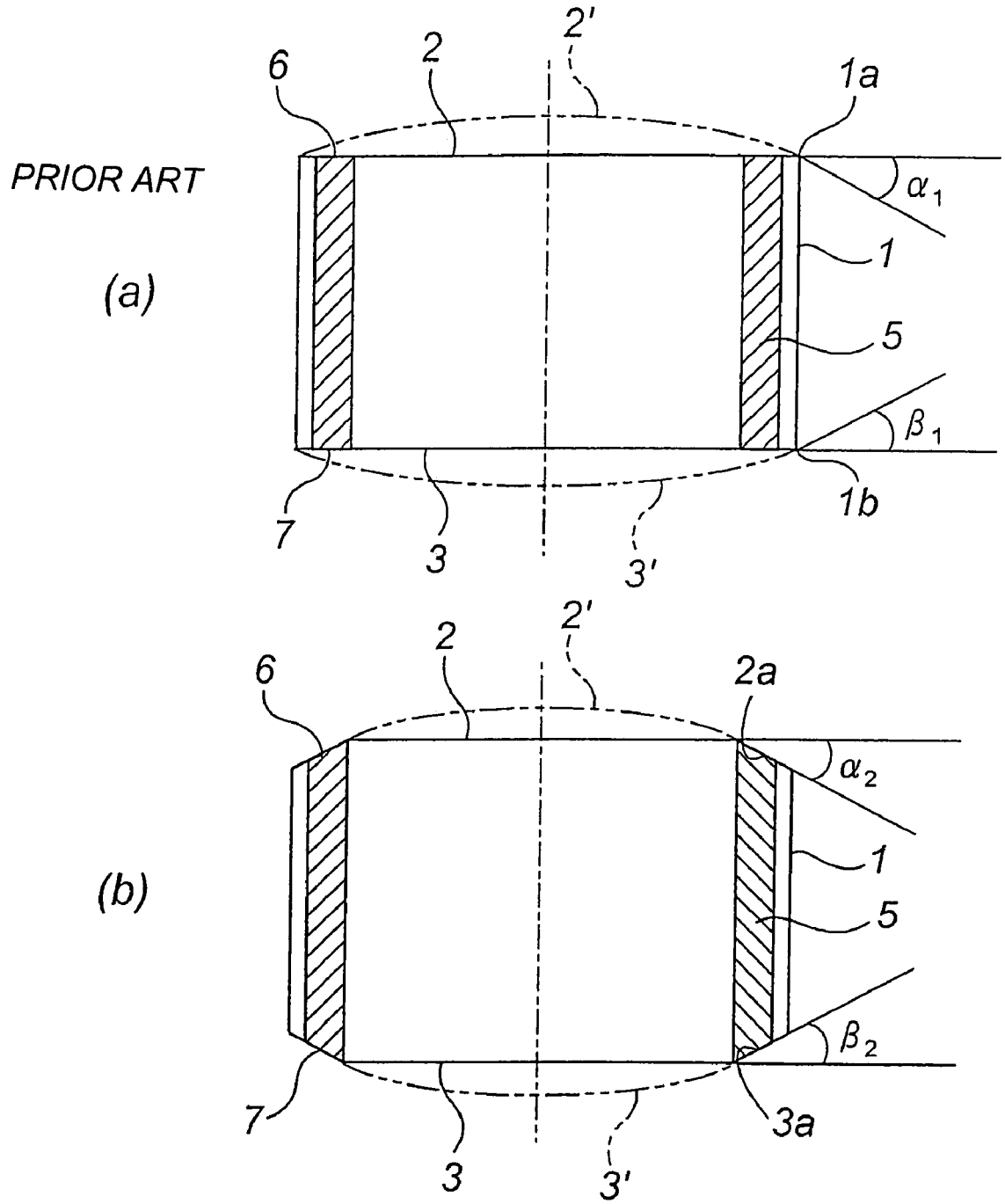
FIG. 6(*a*) illustrates the operation effect of a conventional gas generator.

An upper annular inclined surface 14 is provided in the annular contact portion of the top plate 12*a* and peripheral wall portion 12*b* of the diffuser shell 12, and a lower annular inclined surface 15 is provided in the annular contact portion of the bottom plate 13*a* and peripheral wall portion 13*b* of the closure shell 13. The upper annular inclined surface 14 and lower annular inclined surface 15 may be flat or curved surfaces, and because they are set to a shape similar to that after expansion deformation caused by the actuation of the gas generator (the angle $\alpha 2$ formed by top plate 12*a* and upper annular inclined surface 14 and the angle $\beta 2$ formed by the bottom plate 13*a* and lower annular inclined surface 15 most preferably satisfy the following conditions: $\alpha 1 = \alpha 2$ and $\beta 1 = \beta 2$, as shown in FIGS. 6(*a*), (*b*)), they are practically not expanded.

The prescribed number of gas discharge ports 17 are provided in the diffuser shell 12, and those ports are closed with an aluminum seal tape 60 for moisture proofing. FIG. 1 shows a plurality of gas discharge ports 17 of the same diameter, but a plurality of ports with different diameters may also be provided.

An annular filter 20 is disposed inside the housing 11. End surfaces 21 and 22 of the annular filter 20 are abutted against the upper annular inclined surface 14 and lower annular inclined surface 15 respectively, and the two end surfaces 21 and 22 and upper and lower annular tapered surfaces 14 and 15 are pressed against each other in the axial direction of the housing 11 to improve the short path prevention effect. A filter prepared by multilayer braiding a plain-woven wire mesh and compressing in a mold or a filter substantially composed of a structure obtained by continuously winding a single wire in any number of layers is used as the annular filter 20.

When the annular filter 20 is disposed inside the housing 11, it may be molded in advance to a shape matching the inner shape of the housing. Alternatively, an annular filter with flat end surfaces 21 and 22 may be used and compression-deformed to assume the shape shown in the drawing, when it is abutted against the upper annular inclined surface 14 and lower annular inclined surface 15.

Thus, the upper annular inclined surface 14 and lower annular inclined surface 15 are set to a shape similar to that after expansion deformation caused by the gas generator actuation and the two end surfaces 21 and 22 of the annular filter 20 are abutted or pressed against the upper annular inclined surface 14 and lower annular inclined surface 15. Therefore, a short path of the combustion gas from the contact surfaces of the upper and lower annular inclined surfaces 14 and 15 and the two end surfaces 21 and 22 is prevented.

As shown in FIG. 1, parts of the end surface 21 is in contact with the top plate 12a, and part of the end surface 22 is in contact with the bottom plate 13a, and in order to improve the short path prevention effect, they are so disposed that 80% or more of the total surface area of the respective end surfaces 21 and 22 are in contact with the upper annular inclined surface 14 and lower annular inclined surface 15.

The annular filter 20 is so disposed that a gap 25 is present between the filter and the peripheral wall portions 12b and 13b. Under the effect of this gap 25, the generated gas passes through the entire portion of the annular filter, thereby increasing the generated gas filtration and cooling effect.

A tubular member 30 is disposed concentrically with the housing 11 inside the housing 11. The tubular member 30 comprises a tubular main portion 31 and an annular plane 32 formed integrally with the main portion 31 and extending in the radial direction of the housing from the edge of the open portion at one end thereof.

The inner space of the tubular member 30 serves as a first combustion chamber 35, and the outer space serves as a second combustion chamber 50. An igniter 40 comprising the prescribed amount of a first gas generating agent 42 serving as ignition means and an ignition agent is accommodated inside the first combustion chamber 35. This first gas generating agent is ignited and burned by the actuation of the igniter 40 and serves to ignite and burn a second gas generating agent 42, thereby generating a gas serving as an air bag inflation medium. Moreover, the generated gas produced by the combustion of the first gas generating agent itself is also used for the expansion of air bag.

A plurality of communication holes 34 are provided in the main portion 31 so as to be equidistantly disposed in the circumferential and axial directions, and the first combustion chamber 35 and second combustion chamber are linked via the communication holes 34. The communication holes 34 are closed with an aluminum seal tape from the outside of the main portion 31. Because of the presence of the communication holes 34 arranged in such a manner, the flame and high-temperature gas generated in the first combustion chamber 35 are uniformly diffused inside the second combustion chamber 50, thereby improving the ignition ability of the second gas generating agent 42 located inside the second combustion chamber 50. The size or arrangement of communication holes 34 may be other than uniform, provided that the same effect is obtained. For example, the communication holes 34 in locations close to the igniter 40 can be small, whereas the communication holes 34 in locations far from the igniter 40 can be large, or the communication holes 34 can be displaced toward the locations far from the igniter.

The annular plane 32 of the tubular member 30 abuts against the top plate 12a, and the distal end portion 32a of the annular plane 32, which is bent in the axial direction, abuts against the annular filter 20. In this case, the distal end portion 32a so abuts as to cover the contact portion of the top plate 12a and end surface 21 of the annular filter 20. Therefore, the short path prevention effect is improved. The opening at the other end of the tubular member 30 mates with the outer peripheral surface of a collar 41, thereby preventing the flame of the igniter 40 from flowing directly into the second combustion chamber 50.

As shown in FIG. 5, in the tubular member 30, the main portion 31 and annular plane 32 can be separate members. The diameter of the open portion 33 of the main portion 31 is reduced and a step is formed therein. The annular plane 32 is inserted into the housing 11 so that the bent portion 32b provided therein (the portion facing the distal end portion 32a) abuts against the step portion and the distal end portion 32a abuts against the annular filter 20.

A configuration can be obtained in which, as shown in FIG. 3, a recessed portion 18 provided in the central part of the top plate 12a is fit into the open portion 33 at one end of the tubular member 30. The recessed portion 18 can be formed by emboss processing or the like, and a plurality of such recessed portions may be formed according to the shape and size of the open portion 33 at one end. Thus fitting the recessed portion 18 into the open portion 33 facilitates the positioning of the tubular member 30 during attachment and also makes it easier to abut the distal end portion 32a against the contact portion of the end surface 21 and top plate 12a. Further, when the recessed portion 18 is provided in the state shown in FIG. 5, the recessed portion 18 is positioned in the central hole of the annular plane 32.

The collar 41 of the igniter 40 accommodated inside the first combustion chamber 35 is inserted into the tubular member 30 and fixed therein through the central hole formed in the bottom plate 13a of the closure shell 13. A step portion 45 is formed in the collar 41, and this step portion 45 and bottom plate 13a are mated so as to overlap each other.

The collar 41 and closure shell 13 are fixed, as shown in FIG. 4, by welding (well-known welding method such as laser welding, electron beam welding, and resistance welding) in the contact portion (welded portion 46). As shown in FIG. 4, the step portion 45 and bottom plate 13a overlap and are joined by welding. Therefore, even if the pressure inside the housing rises, the collar 41 with the igniter 40 fixed thereto cannot fall out from the housing 11. Furthermore, the welded portion 46 is provided in a state in which the bottom plate 13a and step portion 45 overlap each other and has a large thickness. Therefore, even when laser welding is employed, the welding beam cannot penetrate through the overlapping portion. As a result, the welding operation is facilitated and the welding penetration width is increased. Therefore, the joint surface area can be increased and pressure resistance can be improved.

The second combustion chamber 50 is provided in the outer space of the tubular member 30, and the prescribed amount of the second gas generating agent 42 is accommodated inside thereof. A retainer 52 serves to adjust the volume of the second combustion chamber 50 to the adequate size corresponding to the filling amount of the second gas generating agent 42.

The second gas generating agent 42 (gas generating agent for air bag inflation) and the first gas generating agent (gas generating agent for flame propagation) are so set that the combustion temperature of the first gas generating agent is higher than the combustion temperature of the second gas generating agent.

A composition prepared by mixing sodium salt of carboxymethyl cellulose as a binder and Japanese acid clay as a residue trapping agent with nitroguanidine as a fuel and strontium nitrate as an oxidizing agent can be used as the first gas generating agent. A composition prepared by mixing sodium salt of carboxymethyl cellulose as a binder and aluminum hydroxide as a cooling agent with guanidine nitrate as a fuel and basic copper oxide as an oxidizing agent can be used as the second gas generating agent 42.

The first gas generating agent and second gas generating agent 42 can be of the conventional shape and size and may have the same or different shape and size. For example, a hole-free pellet may be used as the first gas generating agent, and a cylinder having a through hole may be used as the second gas generating agent 42.

The air bag apparatus in accordance with the present invention is obtained by assembling the gas generator shown in FIGS. 1 to 5 with the conventional air bag apparatus. More specifically, the air bag apparatus in accordance with the present invention comprises the gas generator, an impact sensor for actuating the gas generator upon sensing an impact, an air bag to be inflated by receiving the gas generated by the gas generator, and a module case accommodating the air bag.

The operation relating to the case where the gas generator in accordance with the present invention is assembled with an air bag apparatus for an automobile will be explained with reference to FIG. 1 and FIG. 6.

In the case of automobile collision, a command is received from the impact sensor, the igniter 40 is actuated, the first gas generating agent located inside the first combustion chamber 35 is ignited and burned, and flame and high-temperature gas are generated. The flame and high-temperature gas are injected into the second combustion chamber 50 from a plurality of communication holes 34 (the seal tape closing the communication holes 34 is ruptured) provided in the tubular member 30, the second gas generating agent 42 is ignited and burned, and a gas serving as the air bag inflation medium is generated.

At this time, in the gas generator 10 shown in FIG. 1, the housing 11 is expanded and deformed from the state shown in FIG. 6(*a*) to the state shown in FIG. 6(*b*). However, because the gas generator 10 comprises the upper annular inclined surface 14, lower annular inclined surface 15, and annular filter 20 mated therewith, a sufficient short path prevention effect is demonstrated, and even if the housing 11 is expanded and deformed, the gas that did not pass through the annular filter (the gas that was neither filtered nor cooled) cannot leak out from between the annular filter 20 and the top and bottom plates 12*a* and 13*a*. The annular flat plane 32 of tubular member 30 also contributes to the demonstration of the short path prevention effect.

Because such a short path prevention effect is demonstrated, the generated gas is filtered and cooled with the annular filter and then ruptures the seal tape 60 and is discharged from the gas discharge port 17 to inflate the air bag.

The invention claimed is:

1. A gas generator, comprising:
a housing composed of a peripheral wall portion having a gas discharge port, a top plate, and a bottom plate, the top plate and the bottom plate bulging outwardly upon activation of the gas generator;
a collar directly attached to the bottom plate;
ignition means supported by the collar and accommodated inside the housing;
a tubular member including an upper end and a lower end and provided concentrically with respect to and within the housing such that the lower end is in engagement with the collar and the tubular member defines, in an inner side and an outer side thereof, a first combustion chamber, accommodating a first gas generating agent, and a second combustion chamber, accommodating a second gas generating agent, respectively, the tubular member being provided with a reduced-diameter portion forming a step in the upper end, and a main portion having a diameter larger than the reduced-diameter portion, a plurality of communication holes for communicating the first combustion chamber with the second combustion chamber being provided only in the main portion;
an annular plane extending in a radial direction of the housing from the upper end of the tubular member and including, in an inner side thereof, a bent portion, and being provided such that the bent portion abuts against the step; and
an annular filter disposed so as to surround the tubular member, wherein
the housing is provided with an upper annular inclined surface formed between the peripheral wall portion and the top plate, and a lower annular inclined surface formed between the peripheral wall portion and the bottom plate, a first angle of the upper annular inclined surface with respect to an imaginary line extending perpendicular to an axial direction of the housing and a second angle of the lower annular inclined surface with respect to the imaginary line do not substantially change before and after the activation of the gas generator, and
the annular filter is disposed such that an upper end surface and a lower end surface thereof abut against the upper annular inclined surface and the lower annular inclined surface, respectively, and a gap is provided between an outer peripheral surface of the annular filter and the peripheral wall portion of the housing.

2. The gas generator according to claim 1, wherein the first angle and the second angle are determined, such that an angle formed by the top plate and the upper annular inclined surface and an angle formed by the bottom plate and the lower annular inclined surface are substantially the same as an angle formed by the top plate before bulging and by the top plate after bulging, and an angle formed by the bottom plate before bulging and by the bottom plate after bulging, respectively.

3. The gas generator according to claim 1 or 2, wherein upper and lower end surfaces of the annular filter and the upper and lower annular inclined surfaces are pressed against each other, respectively, in the axial direction of the housing.

4. The gas generator according to claim 1, wherein the annular plane abuts against the top plate, and the ignition means is accommodated and fixed in an open portion at the lower end of the tubular member; and
an outer peripheral edge of the annular plane abuts against an inner peripheral surface of the annular filter and covers, from an inside, a contact portion of the top plate and the upper end surface of the annular filter.

5. The gas generator according to claim 4, wherein the recessed portion is formed in a central part of the top plate.

6. An air bag apparatus, comprising:
the gas generator according to claim 1 or 2.

7. A gas generator, comprising:
a housing including a top plate, a bottom plate, and a peripheral wall including a gas discharge port, the housing further including an upper annular inclined surface formed between the peripheral wall and the top plate, and a lower annular inclined surface formed between the peripheral wall and the bottom plate, the upper annular inclined surface and the lower annular inclined surface encircling the top plate and the bottom plate, respectively, the top plate and the bottom plate bulging outwardly upon activation of the gas generator, the bottom plate being provided with a hole;

a collar attached directly to the hole;

a tubular member including an upper end and a lower end and provided concentrically with respect to and within the housing such that the lower end is in engagement with the collar and the tubular member defines, in an inner side and an outer side thereof, a first combustion chamber, accommodating a first gas generating agent, and a second combustion chamber, accommodating a second gas generating agent, respectively, the tubular member being provided with a reduced-diameter portion forming a step in the upper end, and a main portion having a diameter larger than the reduced-diameter portion, a plurality of communication holes for communicating the first combustion chamber with the second combustion chamber being provided only in the main portion;

an annular plane extending in a radial direction of the housing from the upper end of the tubular member and including, in an inner side thereof, a bent portion, and being provided such that the bent portion abuts against the step; and an annular filter provided inside the housing so as to surround the tubular member, such that a top end and a bottom end of the annular filter keep abutting the upper annular inclined surface and the lower annular inclined surface, respectively, upon an activation of the gas generator, while the top plate and the bottom plate bulge outwardly, wherein a first angle between an imaginary extension line of the top plate before bulging and an imaginary tangential line of the top plate after bulging is substantially equal to a second angle between the imaginary extension line of the top plate and the upper annular inclined surface, wherein a third angle between an imaginary extension line of the bottom plate before bulging and an imaginary tangential line of the bottom plate after bulging is substantially equal to a fourth angle between the imaginary extension line of the bottom plate and the lower annular inclined surface.

8. A gas generator according to claim 7, wherein the annular filter is pressed, inside the housing, by the upper annular inclined surface and the lower annular inclined surface in an axial direction of the housing, and a gap is provided between an outer peripheral surface of the annular filter and the peripheral wall of the housing.

9. A gas generator according to claim 7, wherein the annular plane extends, from the upper end of the tubular member, in a radial direction of the housing such that a distal end of the annular plane abuts an inner surface of the annular filter.

10. The gas generator according to claim 4, wherein the second combustion chamber, that accommodates a second gas generating agent therein, is defined between the tubular member and the annular filter.

11. The gas generator according to claim 9, wherein the second combustion chamber, that accommodates a second gas generating agent therein, is defined between the tubular member and the annular filter.

* * * * *